US006480494B1

(12) United States Patent
Hawley

(10) Patent No.: US 6,480,494 B1
(45) Date of Patent: Nov. 12, 2002

(54) SWITCHING SYSTEM DATA INTERFACE

(75) Inventor: George T. Hawley, Santa Rosa, CA (US)

(73) Assignee: Nokia High Speed Access Products, Inc., Irving, CA (US)

( * ) Notice: Subject to any disclaimer, the term of this patent is extended or adjusted under 35 U.S.C. 154(b) by 0 days.

(21) Appl. No.: 09/094,835

(22) Filed: Jun. 15, 1998

(51) Int. Cl.$^7$ .............................. H04L 12/56; H04J 3/24
(52) U.S. Cl. .................................. 370/395.61; 370/474
(58) Field of Search ................................. 370/352, 354, 370/355–356, 395, 401, 410, 466, 473, 474, 476, 395.6, 395.61, 395.65, 395.1

(56) References Cited

U.S. PATENT DOCUMENTS 5,734,653 A * 3/1998 Hiraiwa et al. ............. 370/395
5,933,607 A * 8/1999 Tate et al. .................. 370/395
5,982,783 A * 11/1999 Frey et al.

* cited by examiner

Primary Examiner—Wellington Chin
Assistant Examiner—Maikhanh Tran
(74) Attorney, Agent, or Firm—Fish & Richardson P.C.
(74) Attorney, Agent, or Firm—

(57) ABSTRACT

Methods and apparatus for communicating data between continuous bit rate trunk channels and a cell-based network are disclosed. The apparatus includes trunk interface circuitry, data interface circuitry, and cell segmentation circuitry. The trunk interface circuitry receives continuous bit rate call data that is being communicated from an originator to a recipient. The data interface circuitry is operatively coupled to the trunk interface circuitry, and is operable to receive the call data from the trunk channel and to extract an original data stream. The cell segmentation circuitry is operative to receive the original data stream from the data interface circuitry and to produce data cells. The invention also features methods of producing data cells. The method includes receiving continuous bit rate call data over a trunk channel, processing the call data to extract an original data stream that is being communicated from an originator to a recipient, segmenting the original data stream into cell payload data, and forming data cells that include the cell payload data.

4 Claims, 10 Drawing Sheets

SWITCHING SYSTEM DATA INTERFACE

BACKGROUND INFORMATION

The present invention relates to a switching system modem interface.

Digitized data, such as data produced by a personal computer, can be transmitted over the "plain old telephone service" (POTS) voice-band phone network using a modem. Conventional modems use POTS compatible electrical signaling to establishes a voice-band communication channel through a POTS central office switching system to a destination modem. The originating and destination modems exchange digital data by encoding the data as voice-band signals which are transported end-to-end across the telephone network. Alternatively, digitized data can be transmitted over integrated services digital network (ISDN) lines end-to-end through digital telephone network connections to destination digital terminations, typically located with destination modems for voiceband data.

Various data-over-POTS modem modulation standards exist to provide POTS-compatible voice-band encoding of digitized data. For example, modems implementing the International Telecommunications Union (ITU) V.34 standard can support 28.8 Kilobit per second (Kbps) voice-band data transmission and modems supporting the V.90 standard can support approximately 56 Kbps in the network-to-user direction, 33.6 Kbps in the user-to-network direction. Lower rate modem or FAX protocols, such as V.17, V.21, V.22, V.22bis, V.27, V.29, V.32, or V.32bis may also be used. The maximum data communication rate between the originating and destination modems is determined by, among other things, the supported modem protocol and the end-to-end electrical interference on the communications channel between the modems.

POTS telephone signals, including those exchanged by POTS voice-band compatible modems, typically originate at POTS customer premises equipment (CPE) and are transmitted over a twisted-pair wire loop terminating at a central office POTS line card. A POTS compatible line card provides signal transmission functions such as ringing voltage, CPE power, dual-tone multi-frequency (DTMF) tone detection, and pulse-dialing detection, as well as conversion of analog POTS signals to and from digital pulse code modulation (PCM) format. Conventional POTS line cards typically interface to a central office POTS switching system (a "POTS switch"). The POTS switch establishes a voice-band data connection by routing a POTS call from the originating CPE to a terminating CPE. At typical digital POTS switches, POTS voice-band signals are converted to a 64 Kbps pulse-code modulated (PCM) data stream. As with other POTS-compatible services, and regardless of the modem's supported data rate, the voice-band frequencies produced by a modem are typically encoded as a 64 Kbps PCM data stream for routing through the telephone network. Routing of modem-originated data through a POTS switch requires POTS switch resources to be dedicated to the voice-band channel between the originating and destination modems. For example, a 64 Kbps time-division multiplexed interoffice trunk may be used to provide the voice-band channel connection to a distant central office or long distance provider switch.

SUMMARY

In general, in one aspect, the invention features a data communication apparatus for communicating data between trunk channels and a cell-based network. The apparatus includes trunk interface circuitry, data interface circuitry, and cell segmentation circuitry. The trunk interface circuitry receives continuous bit rate call data being communicated from an originator to a recipient. The data interface circuitry is operatively coupled to the trunk interface circuitry, and is operable to receive the call data from the trunk channel and to extract an original data stream. The cell segmentation circuitry is operative to receive the original data stream from the data interface circuitry and to produce data cells.

Implementations of the invention may include one or more of the following features. The apparatus may include multiple circuit cards physically connected by a backplane interface to a backplane. Backplane interconnection circuitry may couple the cell segmentation circuitry and the backplane interface to each other for data transmission. The trunk interface circuitry may receive call data from an ISDN primary rate interface "B" channel. The apparatus may also include control circuitry that transmit and receive control data over an ISDN "D" channel. The control circuitry may determine cell routing and other header field data based on received signaling data associated with a particular "B" channel, and may provide the header field data to the cell segmentation circuitry for inclusion in produced data cells. Call data may be a 64 Kilobit per second pulse code modulated representation of a voiceband modem signal.

Implementations may also include trunk interface circuitry that can receive call data from multiple trunk channels. The data from each of the trunk channels may be formed into data cells each having header data associating the data cells with particular trunk channels. The cell segmentation circuitry may include channel bonding circuitry to receive original data streams from multiple trunk channels, produce a composite data stream from the collection of original data streams, and produce data cells associated with the composite data stream.

Furthermore, implementations of the invention may include data cell reassembly circuitry that can extract payload data from data cells and provide the extracted data to the trunk interface circuitry for transmission over a trunk channel. The data interface circuitry may include circuitry to insert start bits and stop bits in the second call data to delimit the second original data stream. The apparatus may include an asynchronous network interface to transmit data cells from the cell segmentation circuitry to a data cell network.

In general, in another aspect, the invention features a method of producing data cells. The method includes receiving continuous bit rate call data over a trunk channel, processing the call data to extract an original data stream that is being communicated from an originator to a recipient, segmenting the original data stream into cell payload data, and forming data cells that include the cell payload data.

Implementations of the invention may include one or more of the following features. Extracting the original data stream may include extracting segments delimited by start bits and stop bits. Call data may be received over a second trunk channel, processed to produce a second original data stream, segmented into second cell payload data, and formed into second data cells. The data cells may include header data associating data cells with their respective trunk channel. Data cells may also be received over the backplane interface. Second call data may be produced by extracting payload data from the second data cells, and the second call data may be transmitted over a trunk channel. Segmenting the original data stream may include processing by cell segmentation circuitry to produce data cells that include header and payload data in accordance with the ATM Adaptation Layer-5 protocol.

In general, in another aspect, the invention features a data communication apparatus for communicating data between trunk channels and a cell-based network. The apparatus includes trunk interface means for receiving call data over a trunk channel, data interface means for receiving the call data and extracting a data stream, and cell segmentation means for receiving the data stream and producing data cells.

Implementations of the invention may provide one or more of the following advantages. The use of POTS and ISDN phone network and trunk resources can be reduced. Efficient transmission of bursty data from a continuous bit rate data source can be achieved. Other features and advantages will become clear from the description and claims that follow.

DETAILED DESCRIPTION

Figure 1:
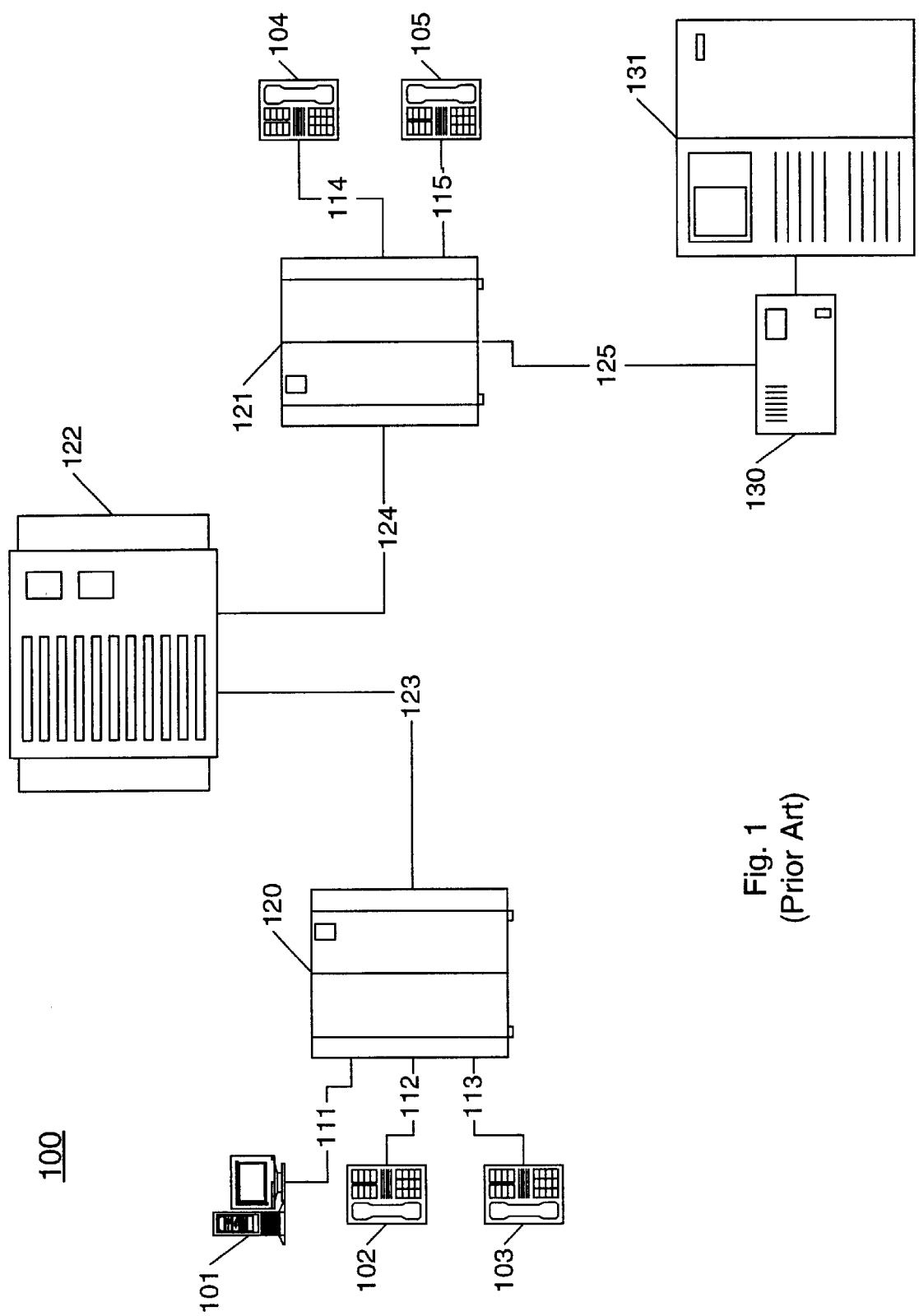
FIG. 1 is a POTS voice-band and ISDN phone network.

FIG. 1 illustrates an exemplary POTS and/or ISDN phone network. The phone network 100, may include multiple central offices, each serving customers within a particular geographic region. Each central office includes a digital central office switch, such as an Lucent Technology 5ESS switch, for routing constant bit rate POTS and ISDN calls (referred to herein as "channel" connections). For example, a first central office may be served by switch 120 while a second central office is served by switch 121. Voice-band POTS signals and/or ISDN digital signals are exchanged between customer premise equipment (CPE) 101–105 and switches 120 and 121.

POTS/ISDN switches 120 and 121 are typically coupled to twisted-pair wire loops 111–115 by POTS or ISDN line cards. POTS line cards can generate and terminate analog POTS signals sent over loops 111–115 from CPE 101–105 and convert the analog POTS signals to an electrical signal compatible with the central office switch. In a central office having a digital POTS/ISDN switch, such as a Lucent Technology 5ESS switch, analog POTS signals are converted by POTS line cards to a constant bit rate (CBR) 64 kilobit per second (Kbps) pulse code modulated (PCM) channel. To support voice services, ISDN line cards directly transmit and receive 64 Kbps PCM voice data over bearer (or "B") channels with ISDN CPE. ISDN line cards may also transmit 64 Kbps CBR data to ISDN CPE. ISDN basic rate interface (BRI) CPE can support two 64 Kbps bearer channels and one 16 Kbps BRI data (or "D") channel. The D channel is typically used to exchange signaling and call control messages between the ISDN CPE and the OTS/ISDN switch.

A POTS/ISDN switch 120, 121 can route POTS and ISDN calls between subscribers interconnected to the switch and can route calls to subscribers at remote switches. Calls are typically routed to remote switches using high capacity "trunk" connections 123 and 124. Trunk connections 123 and 124 are typically provided using standardized synchronous digital trunk connections such as 1.5 Megabit per second (Mbps) T1 trunks, 1.5 Mbps integrated services digital network (ISDN) 23B+D primary rate interface (PRI) trunks, 45 Mbps T3 trunks, or 155 Mbps synchronous transfer mode (STM) synchronous optical network (SONET) connections. Typically, such trunk connections include multiple 64 Kbps continuous bit rate (CBR) channels. Each CBR channel is typically dedicated to a single POTS voice-band call or a single ISDN B-channel connection. Trunk connections 123 and 124 may be routed through an intermediate switch, known as a "tandem" switch 122. A tandem switch 122 allows multiple central office switches 120 and 121 to be interconnected at the tandem switch.

Data can be transmitted across a POTS/ISDN network 100 from a personal computer 101 equipped with a POTS modem or ISDN terminal adapter to, for example, an Internet service provider (ISP) point of presence (POP), or other data service provider. A POTS modem converts an original data stream to a POTS network compatible signal format thereby allowing the original data stream to be transported through the POTS voice band network 100 using standard POTS signaling and voice call routing by the POTS switches 120 and 121 and tandem switch 122. Such a call may be routed from the originating computer 101 through a local central office switch 120 through a tandem switch 122 to the destination switch 121. At the destination switch 121, the call may be further routed through an 1.5 Mbps integrated services digital network (ISDN) 23B+D primary rate interface (PRI) or other trunk connection 125 to a modem bank 130. Modem bank 130 may be, for example, an Ascend Communications Max TNT modem bank, a 3Com/US Robotics Total Control Access modem bank, a Cisco Systems modem bank, or a Livingston/Lucent modem bank. A modem bank 130 may also be referred to as a remote access server or a remote access concentrator. Similarly, an original data stream transported from ISDN CPE in an ISDN "B" channels may be routed from the ISDN CPE across a network to an ISDN compatible modem bank.

The modem bank 130 is connected to the data service provider's computer equipment 131 by, for example, an Ethernet connection, an SCSI connection, or other digital interface. The modem bank 130 can receive multiple POTS and/or ISDN calls and convert modulated data to demodulated digital data that is exchanged with the computer equipment 131 along with digital data from ISDN B-channels. For example, a modem bank 130 having an ISDN 23+D PRI interface can receive twenty-three separate POTS calls from V.34 modems, convert the received data to 28.8 Kbps data streams, and then convert the 28.8 Kbps to Ethernet data packets which, in turn, are exchanged with computer equipment 131. Similarly, PRI B channels can contain digital data originating from customer premises basic rate ISDN B channels that is exchanged with computer equipment 131 along with POTS modem data.

In a typical network 100, each POTS 64 Kbps CBR trunk connections is dedicated to a single POTS call for the duration of that call. In the case of computer data, such dedicated trunk usage can be inefficient when, for example, the data exchanged during the call is "bursty." Data is "bursty" when a data exchange includes periods of relatively high data transfer activity followed by relatively long periods of little or no activity. During the periods of little or no inactivity, the 64 Kbps POTS channel remains dedicated to the POTS connection. This dedicated channel usage can place excess demands on network capacity and, consequently, lower quality of service in the network 100. Similarly, customer basic rate interface ISDN B channels tie up one or two 64 Kbps CBR channels through the network for the duration of the ISDN B channel connection.

Figure 2:
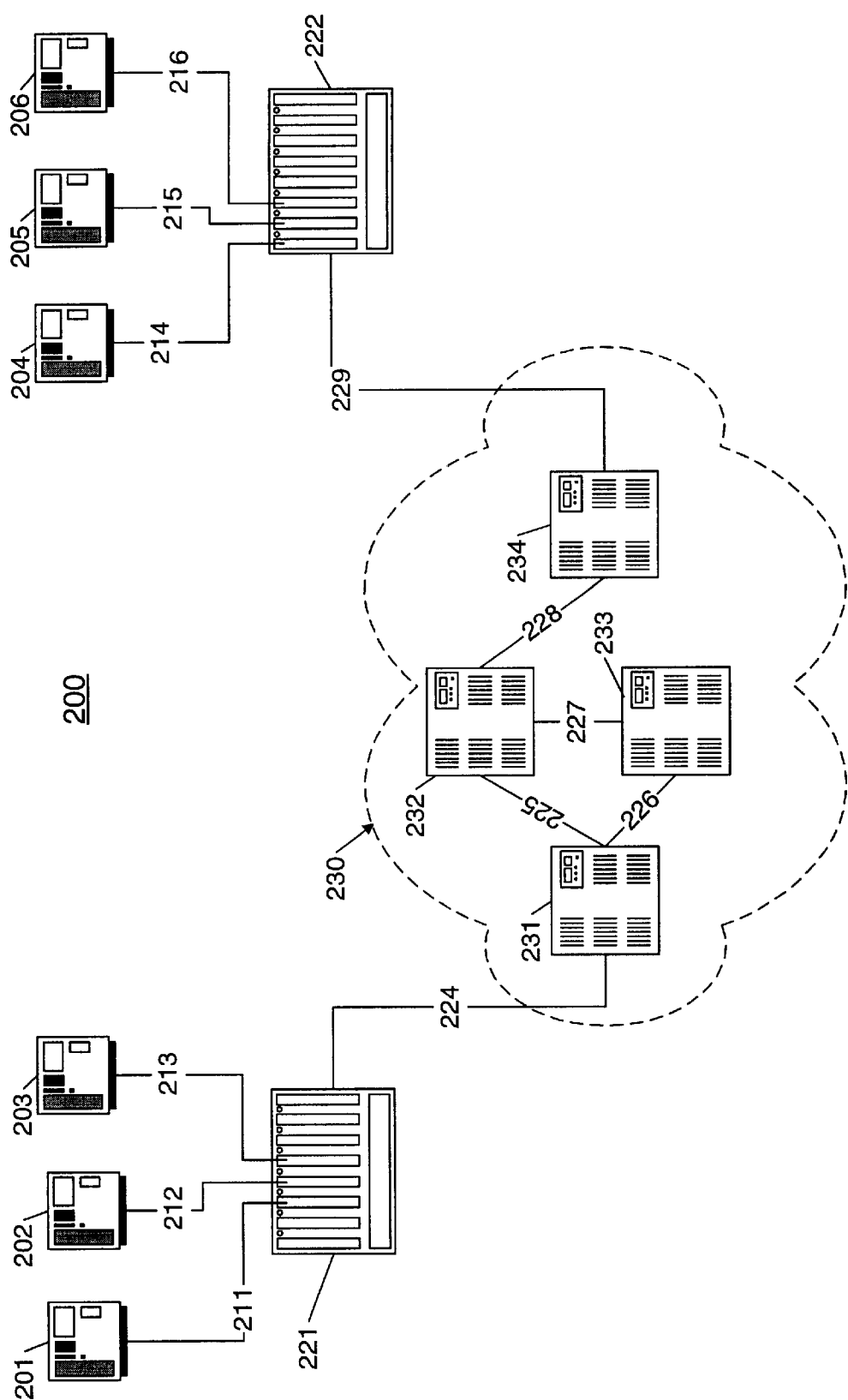
FIG. 2 is an Asynchronous Transfer Mode network.

Alternative data transfer networks may use shared transmission resources and end-to-end digital data transmission. One such alternative is an asynchronous transfer mode network. FIG. 2 illustrates an asynchronous transfer mode (ATM) network. The ATM network 200 routes fixed-size packets of data, known as ATM cells, between endpoints. In the ATM network 200, digital connections 211–216 between customer premise equipment (CPE) 201–206 and ATM-based digital subscriber line access multiplexers (DSLAMs) 221 and 222, typically located in phone company central offices, provide an interconnection point to ATM cell routing switches in an ATM network 230. The DSLAMs 221 and 222 may be, for example, Diamond Lane Communications Corp. Speedlink system, Cisco Systems Model 6100, Alcatel DSLAM Model AA1000, or other DSLAM. Digital connections 211–216 can be provided using, for example, digital subscriber line (DSL), asynchronous digital subscriber line (ADSL), high bit rate digital subscriber line (HDSL), T1, T3, or other digital data transmission technology.

ATM cells from multiple CPE endpoints 201–206 can be multiplexed over shared network communications links 224–229 and routed by ATM switching nodes ("ATM switches") 231–234. ATM switches are circuit oriented, low-overhead packet switches using virtual channels to provide switching and multiplexed data transmission. In general, the communication capacity of an ATM cell path can be shared among multiple end points through the use of ATM cell multiplexing. Asynchronous time division (ATD) and fast packet switching are alternate terms which have been employed to describe similar data transfer technologies.

ATM switches and networks transfer information using a data cell format that typically conforms to one of the ATM cell formats adopted by the International Telecommunications Union (ITU). ITU-standard ATM cells have a 5-byte header field and a 48-byte payload field. The header field carries information pertaining to the transport and routing of an ATM cell through ATM switching equipment in a communications network. The payload field is available to transfer data originating at or destined to CPE 201–206.

Figure 3A:
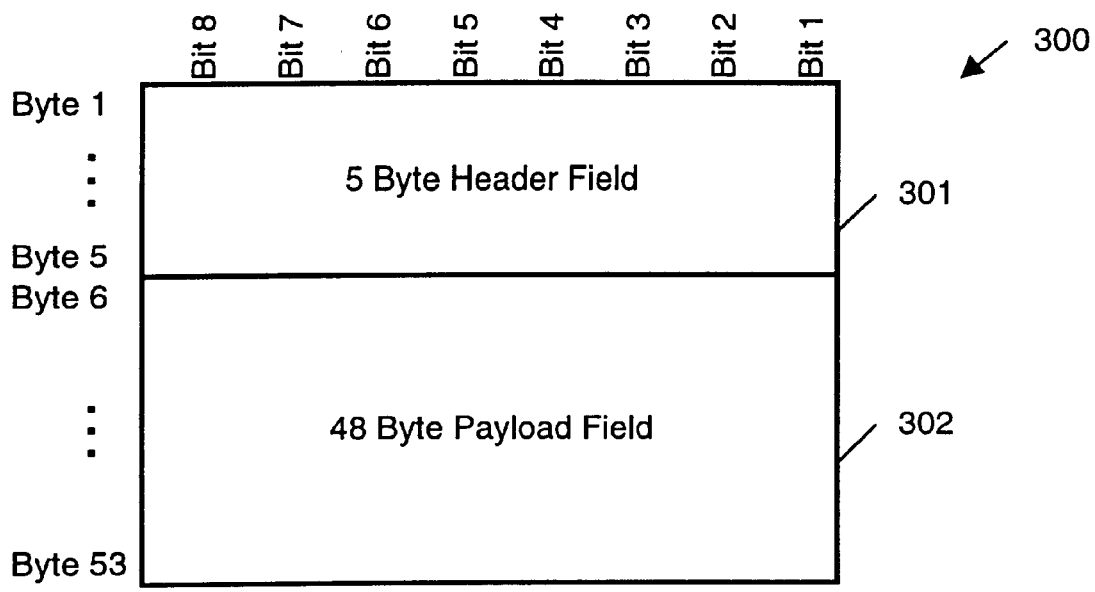
FIGS. 3A, 3B, and 3C illustrate standard ATM cell fields.
Figure 3B:
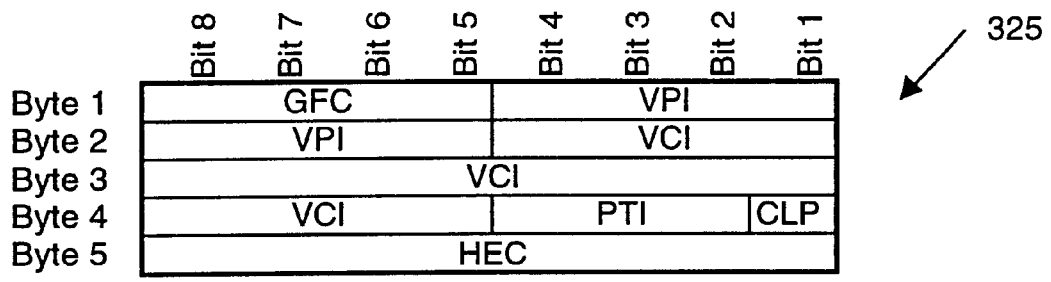
Figure 3C:
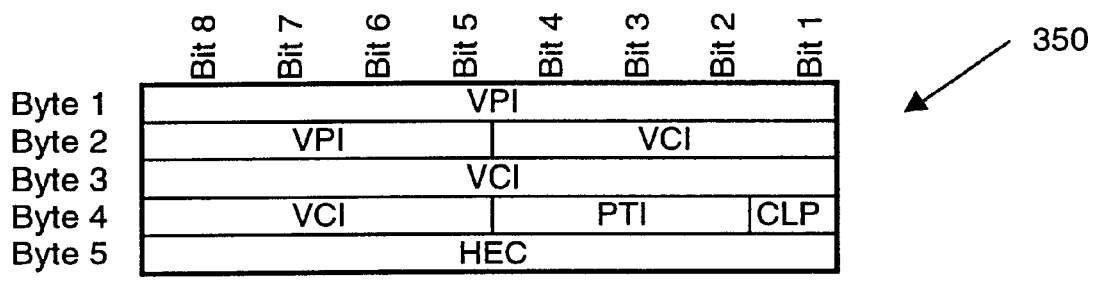

FIG. 3A illustrates an ATM cell having a 53-byte format as defined by the ITU. The ATM cell 300 includes a header field 301 and a payload field 302. An ITU-standard header field 301 may be either a user-network interface header 325 (FIG. 3B) or a network-network interface header 350 (FIG. 3C). A user-network header 325 (FIG. 3B) and a network-network interface header 350 (FIG. 3C) each include a virtual path identifier (VPI) field and a virtual channel identifier (VCI) field. The VPI and VCI fields transport information used to route the ATM cell through an ATM network 230 and to associate each ATM cell multiplexed on a shared path with the particular CPE 201–206 hat the cell originates from or is destined to. Additional information on the VPI and VCI header fields, and on the GFC, PTI, CLP, HEC header fields can be found in *ATM User-Network Interface Specification Version* 3.1, ATM Forum, 1994.

ATM data transmission can be advantageous for CPE having "bursty" data transmission patterns. Such CPE may have long periods of data transmission inactivity wherein ATM cells are neither transmitted nor received. During such periods, shared transmission resources such as trunks 224–229 are not used by the particular CPE and the capacity of those shared resources may be allocated to other CPE in the ATM network 200.

Figure 4A:
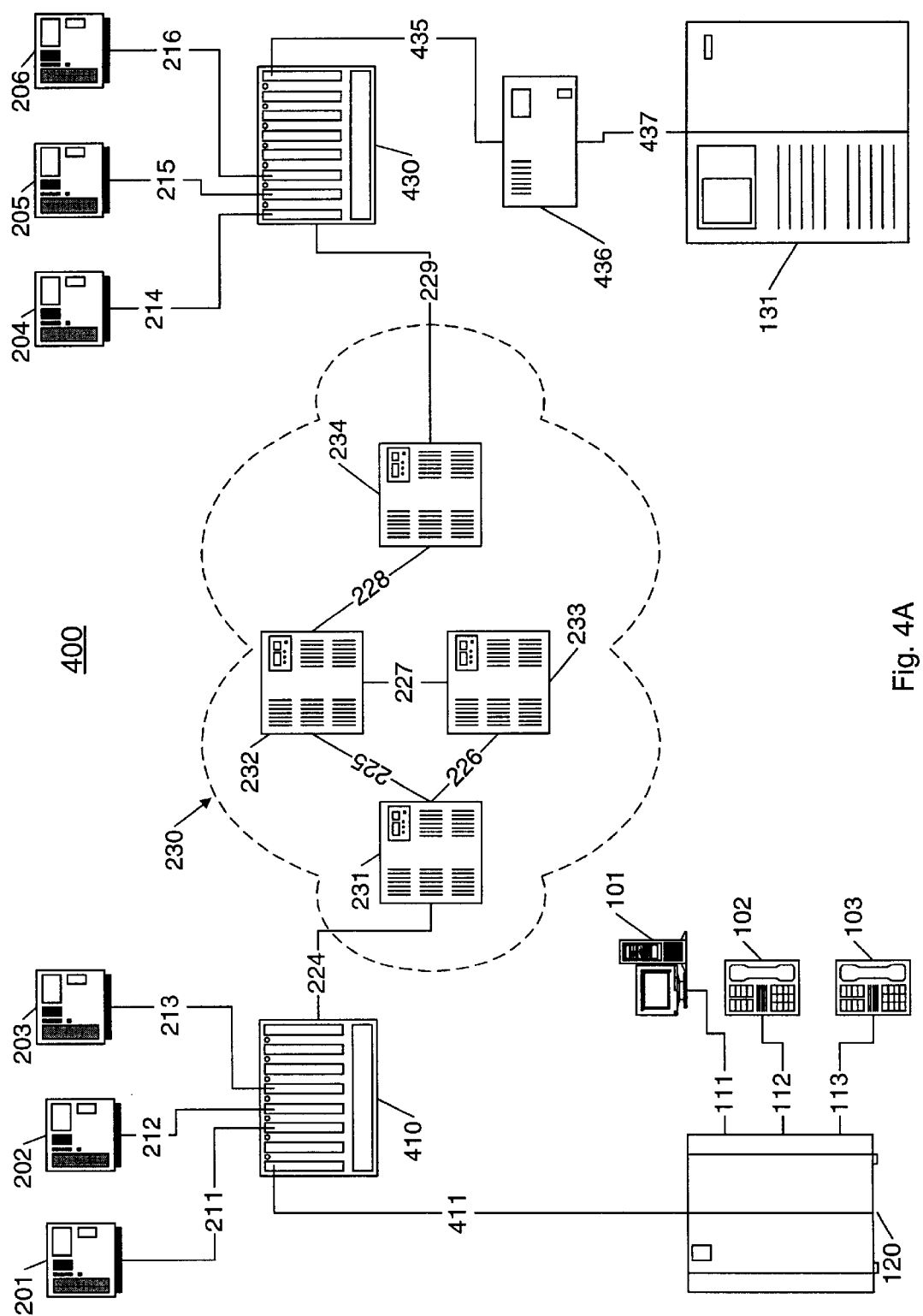
FIGS. 4A and 4B are elements of a hybrid network, in accordance with the invention.

Referring to FIG. 4A, a hybrid network 400 interconnecting POTS and ATM transmission elements is shown. In the network 400, data originating at or destined to a POTS voice-band modem or ISDN CPE may be converted to ATM cells at the originating central office and transported through an ATM network to the service provider, avoiding the use of telephone network trunk and tandem switch capacity. The network 400 includes a number of elements similar to those shown in FIGS. 1 and 2 (like numbered elements in FIGS. 1, 2, and 4A having substantially equivalent functions). The network 400 includes a POTS central office switch 120 enabling POTS voice band service to POTS CPE 101–103. The POTS switch 120 may include trunk interfaces to additional POTS network switching equipment providing conventional call routing through a POTS network 100 (FIG. 1). The switch 120 also includes a trunk interface 411 to, a modem bank card in a ATM-based digital subscriber line access multiplexer 410.

The trunk connection 411 may be an ISDN 23B+D PRI connection allowing up to 23 POTS calls or ISDN-B channel connections to be routed to the DSLAM 410. The interface 411 can also be another type of trunk interface such as a T3 interfaces, a T1 interfaces, or a SONET interface, and may include additional signaling interfaces such as a signaling system 7 (SS7) interface. POTS calls carrying modulated data, and ISDN B-channel connections from a equipped computer 101 can be routed to the DSLAM 410 by the POTS switch. At the DSLAM the continuous bit rate channel is converted to and from ATM cells for transmission over an ATM network 230.

Figure 4B:
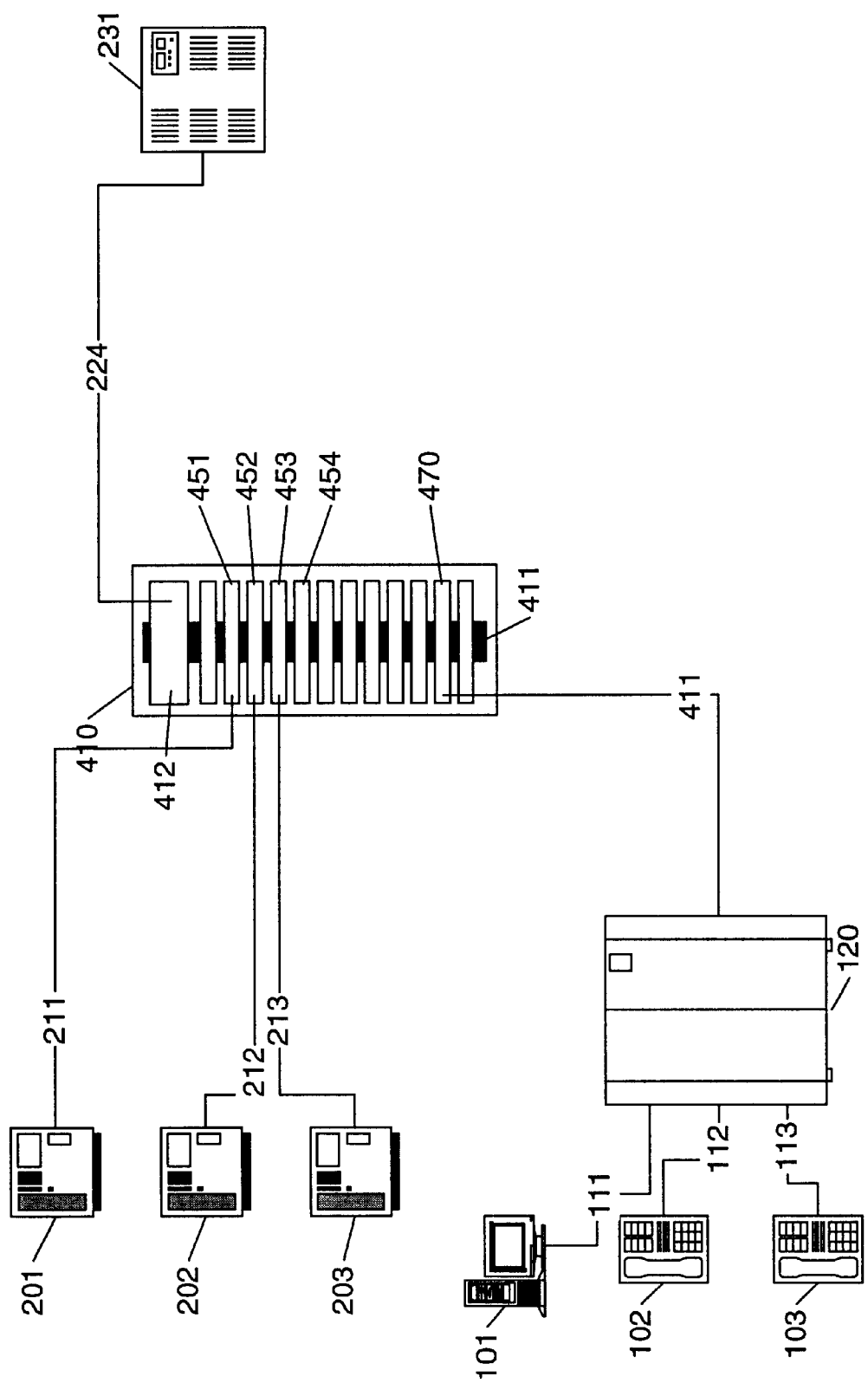

Referring to FIG. 4B, in a circuit card implementation, the DSLAM 410 includes a backplane bus 411 receiving multiple circuit cards and interconnecting the circuit cards to each other and to an ATM network interface card 412. For example, the DSLAM 410 can receive digital subscriber line cards 451–453 to receive ATM-based cell traffic over twisted pair connections 211–213. Additionally, the DSLAM 410 may include interfaces to operations, administration, maintenance, and provisioning (OAMP) systems, network control systems, and network signaling systems. The DSLAM 410 also includes a modem bank card 470 coupled by a trunk connection 411 to a central office switch 120. The modem bank card enables the extraction of an original data stream sent from a trunk channel.

In various implementations, the original data stream extracted by the modem bank card 470 can, for example, be formatted into ATM cells by the modem bank card 470 or can be formatted into ATM cells by other DSLAM 410 circuitry. The original data stream is, for example, data originating at a personal computer and which is subsequently modulated by a POTS voiceband modem or ISDN terminal equipment. The original data stream may be delimited by start and or stop indicators ("start bits" and "stop bits") in the continuous bit rate transmission from the modem or ISDN terminal equipment. The produced ATM cells may then be exchanged over the backplane 412 from the modem is bank card 470 to an ATM network interface 412 and provided to ATM network equipment 231 for routing to, for example, a destination DSLAM 436 (FIG.

4A) where the ATM cells may be converted back to a modulated voiceband modem signal or an ISDN data stream. If the destination CPE 436 is ATM compatible, the destination DSLAM 436 may provide ATM cells over an interconnection 435 to the CPE 436. The ATM CPE 436 provides an interface to the data service provider's computer equipment 131. In an analogous manner, an original data stream may be returned from the destination CPE to the originating CPE.

Figure 5:
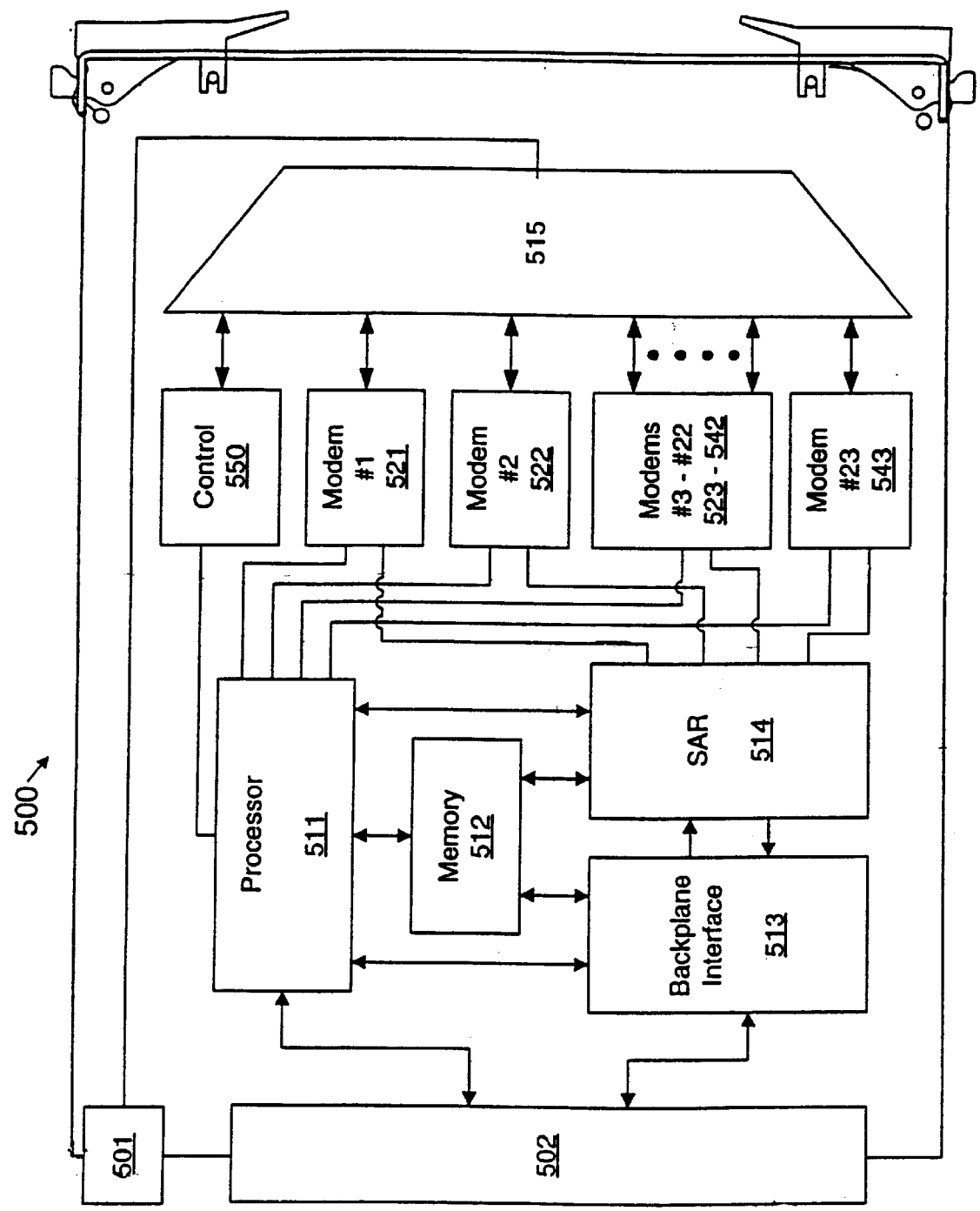
FIG. 5 is a functional diagram of a DSLAM modem card, in accordance with the invention.

Referring to FIG. 5, a modem bank card 500 for use in a DSLAM 410 is shown. The modem bank card 500 has trunk interface 501 to a POTS switch 120 (FIG. 4A) and an interface 502 to a backplane interconnecting components of the DSLAM 410. In an ISDN trunk embodiment, the interface 501 may be an ISDN 23B+D PRI interface. An ISDN 23B+D PRI interface has twenty-three 64 Kbps "bearer" (B) channels and one 64 Kbps PRI data (D) channel. The twenty-three B channels provide up to 23 digitized POTS connections between the card 500 and the switch 120 (FIG. 4A). The D channel transports signaling and control information between the POTS switch 120 (FIG. 4A) and the card 500.

The modem bank card 500 includes multiplexing circuitry 515 that couples each of the twenty-three B-channels to a modem interface 521–543. Circuitry 515 also couples the ISDN PRI D-channel to a control interface circuit 550. Each modem interface 521–543 exchanges modem-modulated data with the multiplexer 515 and exchanges an original data stream with ATM cell segmentation and reassembly (SAR) circuitry 514. The segmentation and reassembly (SAR) circuitry 514 converts the received incoming data into ATM cells. Conversion to ATM cells may be done using standard ATM adaptation layer 5 services (AAL-5) or other standard or proprietary ATM adaptation layer services. AAL-5 and other AAL data conversion services are defined in Bellcore publication GR-1113-CORE, *Asynchronous Transfer Mode and ATM Adaptation Layer (AAL) Protocols*, 1994. SAR circuitry 514 may be a general purpose microprocessor programmed to implement AAL-5 or other adaptation layer protocol. Alternatively, SAR circuit functions may be performed by processor 511 or may be implemented in special purpose circuitry.

SAR circuitry 514 converts the data received by modem interface circuits 521–543 to ATM cells by placing the received data into the payload field of an ATM cell and adding an ATM cell header to the data. The ATM cell header includes data to identify the modem interface 521–543 that transferred the data to the SAR circuitry. For example, to identify the modem circuit associated with a particular data cell, the SAR circuitry 514 assigns unique VPI/VCI values to each modem interface 521–543. For example, the SAR circuitry may store twenty-three unique VP/VCI values in memory 512 and associate each interface 521–543 with a differing one of these twenty-three unique VPI/VCI values. The twenty-three VPI/VCI pairs may be provided to the card during a card initialization stage wherein a network control device coupled to the card over backplane interface 502 configures the VPI/VCI information stored in card memory 512. A unique incoming data VPI/VCI value and a differing unique outgoing data VPI/VCI value may be associated with each modem interface 521–543 or the same value may be used in both directions.

Assignment of VPI/VCI values and other header data may be controlled by a control processor 511 or may be controlled by a network management processor that communicates operations, administration, maintenance, and provisioning (OAMP) data to the processor 511 over the DSLAM backplane interface 502. In a statically allocated VPI/VCI implementation, VPI/VCI values are predetermined and a single VPI/VCI value is associated with each transceiver 521–543 by an external network control system. The assigned VPI/VCI value determines a path through the ATM network 230 (FIG. 4) to a predetermined destination, such as to a predetermined data service providers ATM interface 436. A statically allocated VPI/VCI implementation may be used where, for example, each card 500 in a DSLAM 410 is associated with a single POTS hunt group such that all POTS data calls arriving at a particular card 500 are destined to the same data service provider.

Alternatively, in a dynamically allocated VPI/VCI implementation, VPI/VCI values are dynamically determined based on signaling data received over the ISDN-D channel. For example, standard ISDN Q.931 signaling messages sent over the ISDN D channel and received by control circuitry 550 may identify the dialed destination number associated with each B-channel in the ISDN PRI trunk. Each B-channel may be associated with a different dialed destination number and that number may change on a per-call basis as determined by number dialed at the originating CPE. Processor 511, by using the dialed destination number, determines the destination data service provider associated with the POTS call and can associate a VPI/VCI pair associated with that dialed destination. The selected VPI/VCI pair may be based on table of values stored in memory 512 relating dialed destination numbers to VPI/VCI values.

In an exemplary table assignment method of VPI/VCI assignment, a first data service provider may be associated with, for example, the dialed digits "202-555-1234" and a second data service provider may be associated with the dialed digits "402-555-5678." Memory 512 may include a first group of VPI/VCI values associated with the first dialed digits "202-555-1234" and a second group of VPI/VCI values associated with the second dialed digits "402-555-5678." The first group of VPI/VCI values providing for cell routing between the card 500 and ATM cell receiving equipment associated with the first data service provider, and the second group of VPI/VCI likewise providing routing to a second data service provider. The card 500 may be coupled to a central office switch that is configured to route all calls to either the first or second dialed digits to the same card 500. When a new call is established between the switch and the card 500 over a particular "B" channel, the "D" channel may include signaling information indicating whether the first or the second digits were dialed at the originating CPE. If the first digits were dialed, an unused VPI/VCI value from the first group of VPI/VCI values is associated with the "B" channel. Similarly, if the second digits were dialed, an unused VPI/VCI value from the second group of VPI/VCI values is associated with the "B" channel.

In another embodiment, the VPI/VCI values may be determined by communication between the processor 511 and a separate control card in the DSLAM 410. Still other methods of assigning VPI/VCI values m ay be used. Modem bank cards having non-ISDN interfaces to the POTS switch, such as cards having T1 interfaces, may include other signaling and control mechanisms for the assignment of VPI/VCI data. For example, a modem card may have an interface to a POTS phone network common channel signaling system, such as a signaling system seven (SS7) network, or may have control circuitry to process T1 trunk "robbed bit signaling" information.

ATM cells are assembled from modem interface 521–543 data streams by SAR circuitry 514 and are sent to backplane interface circuitry 513. The backplane interface circuitry 513 controls transmission of data from the modem bank card over the DSLAM backplane to an ATM network interface at the DSLAM. The interface circuitry 513 includes, for example, ATM cell buffering, bus signaling, and bus arbitration functions. Bus interface circuitry 513 implements, for example, a CompactPCI™ bus interface, a VMEbus™ interface, or other bus or non-bus (point-to-point) interface or a backplane interface in a Diamond Lane Communications Corporation Speedlink™ Multiplexer (formerly known as a Hitchhiker™ Multiplexer)

The modem bank card 500 can also receive ATM data cells from the DSLAM network interface circuitry and convert the data cells to modulated voice-band POTS data signals for transmission to CPE modems. Line card backplane interface circuitry 513 receives the ATM cells from the DSLAM ATM network interface or other DSLAM component and may buffer the received ATM cells prior to sending the cells to SAR circuitry 514. SAR circuitry 514 determines an appropriate modem interface 521–543 based on ATM header data, such as VPI(VCI data, extracts the outgoing data from the ATM cell payload, and sends the outgoing data to the determined destination modem interface for transmission over a bearer (B) channel to a POTS switch. The POTS switch, in turn, completes the connection to customer premise modem CPE.

Buffering functionality may be implemented in modem interface circuitry 521–543 and/or SAR circuitry 514 and/or backplane interface 512 to regulate data flow by the modem interfaces 521–543 and to maintain a transmission bit rate compatible with the CPE modem. For example, serial data start and stop bits may be exchanged with the CPE modem to indicate when valid data is being sent. SAR circuitry may include functionality to generate data start and stop bits to properly regulate the flow of data from the modem bank card to CPE modems. For example, a data stop bit may be sent to the CPE modem if there is no data to be sent from the modem bank card to the CPE modem. When stop bits are received from the CPE modem, indicating a period of inactivity, the SAR circuitry 514 need not generate ATM cells for the particular modem connection. Similarly, during periods when ATM cells destined to a particular modem connection are not received (indicating data transmission inactivity at the data service provider end of the connection), the SAR circuitry may insert stop bits in the data stream sent to modem interface circuits 521–543.

Modem bank card circuitry, such as processor 511, may implement high-level protocol functions to facilitate data transfer over POTS modem connections. For example, the interface card 500 may, in various embodiments, include support for communications protocols such as the point-to-point protocol (PPP), serial line interface protocol (SLIP), network control protocol (NCP), internet protocol (IP), internet protocol control protocol (IPCP), password authentication protocol (PAP), and the challenge handshake authentication protocol (CHAP). The interface card may include a backplane interface to a DSLAM control processor or other processing element to enable processing of these protocols. Furthermore, the modem bank card may encapsulate data originating at the CPE and provide that data over an ATM network to a server 436 (FIG. 4) where various communication protocols may be processed.

Figure 6:
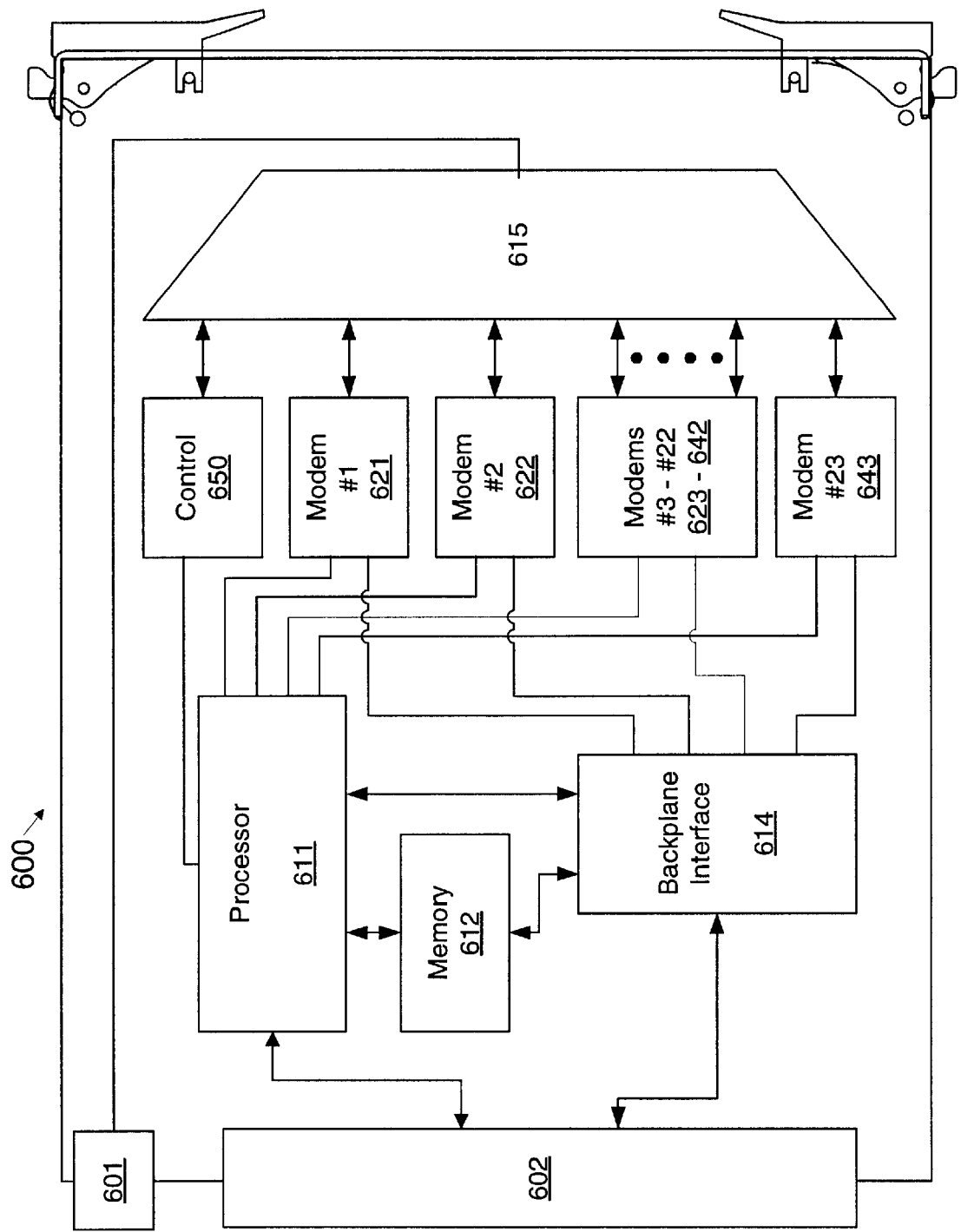
FIG. 6 is a functional diagram of a DSLAM modem card, in accordance with the invention.
Figure 7:
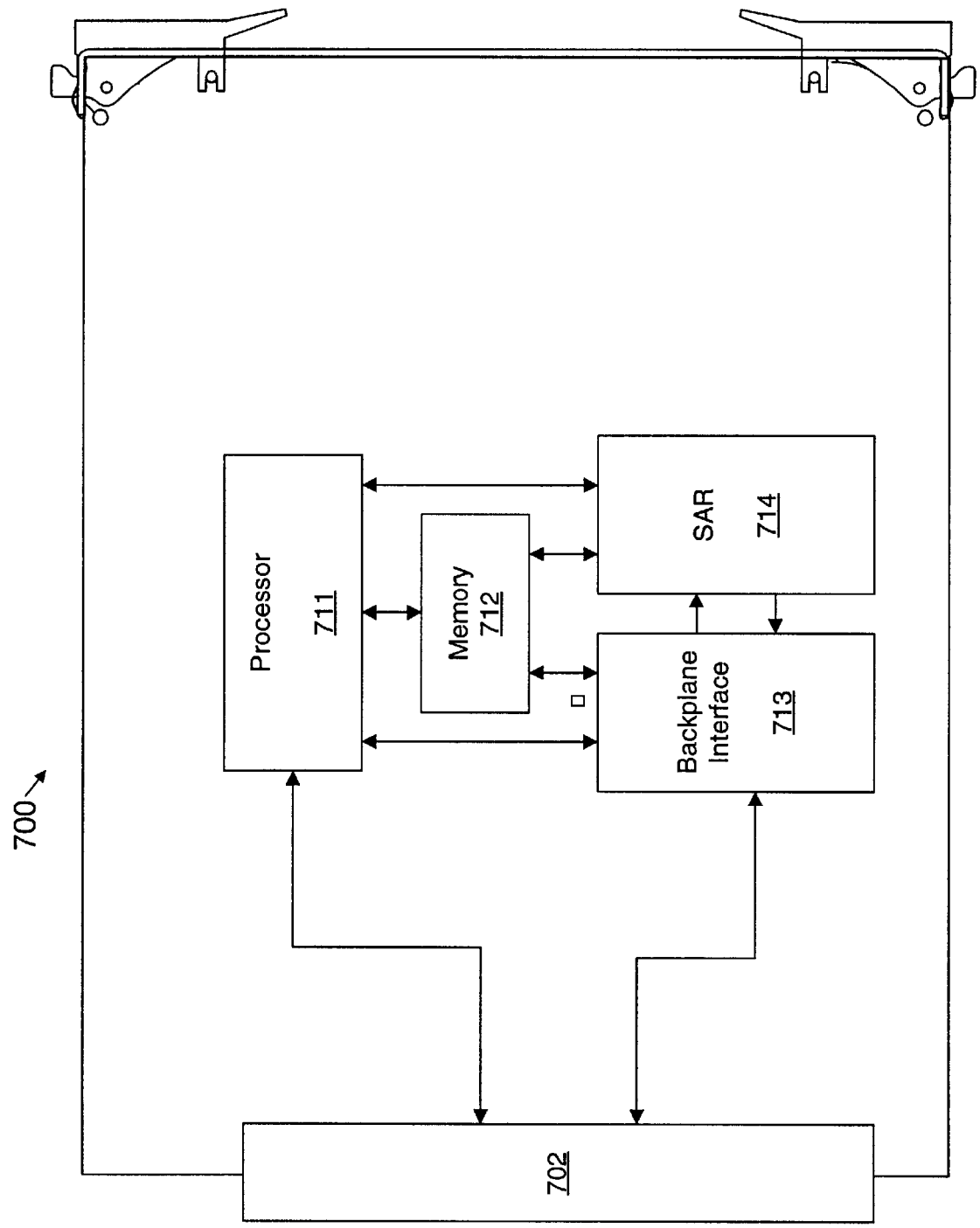
FIG. 7 is an ATM circuit card, in accordance with the invention.

Modem interface circuitry 521–543 and ATM cell conversion may be provided on separate DSLAM circuit cards. Referring to FIGS. 6 and 7, a modem bank card 600 has a trunk interface 601 to a POTS switch 120 (FIG. 4) and an interface 502 to a backplane interconnecting components of the DSLAM 410. The interfaces 601, 602, and circuitry 615 and 621–643, and 650 correspond substantially to elements 501, 502, 515, 521–543, and 550 of FIG. 5. Modem interfaces 621–643 of modem bank card 600 convert data arriving at the card over POTS trunk connections into a demodulated digital data stream. The demodulated digital data stream is exchanged over the backplane interface 602 by backplane interface circuitry 614 with an ATM cell conversion card. Referring to FIG. 7, the demodulated digital data stream from one or more modem bank cards 600 is exchanged with an ATM cell conversion card 700 over backplane interfaces 601 and 701. The cell conversion card 700 converts a constant bit rate data stream received from the modem card to ATM cells by performing ATM cell segmentation and reassembly and assignment of ATM cell header data.

Figure 8:
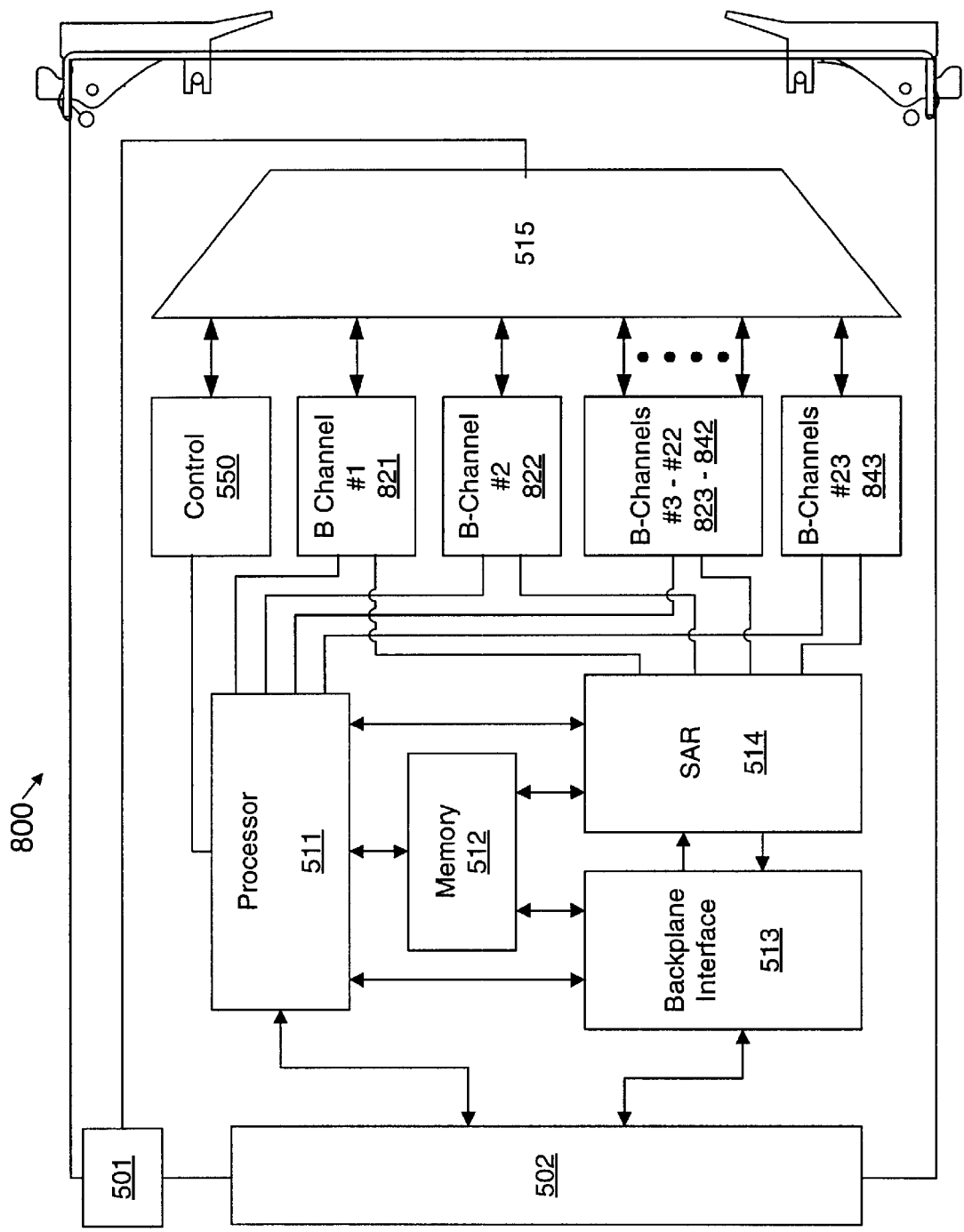
FIG. 8 is a functional diagram of a DSLAM ISDN card, in accordance with the invention.

Continuous bit rate data from basic rate ISDN (2B+D) connections may also be converted into ATM cells for transport by an ATM network. Referring to FIG. 8, an ISDN bank card 800 is shown. Elements 501–502, 511–515, and 550 of FIG. 8 correspond in function to like number elements of FIG. 5. The ISDN bank card 800 receives an ISDN primary rate interface connection from a switch 120 over interface 501. Each B-channel exchanged over the ISDN primary rate connection is provided to a B-channel interface circuit 821–843. B-channel interface circuits 821–843, like modem circuits 521–543 (FIG. 5), exchange data with SAR circuitry for processing and conversion to ATM cells as described with respect to the card 500 (FIG. 5).

In a channel-bonding implementation, each modem card 500, 600 or ISDN interface card 800 provides channel bonding services. Channel bonding refers to a combining of multiple lower rate data connections into a single higher rate data connection. For example, referring to FIG. 4, a personal computer 101 may have two modems and two POTS connections 111 to a POTS switch 120. Each modem may be a V.34 modem capable of 28.8 Kbps data transmission. If a large data transfer between the computer 101 and a remote source is desired, the two 28.8 Kbps data transmission channels from the computer 101 can be "bonded" to function as a single data transmission channel having a transmission capacity of approximately 56 Kbps.

Referring to FIG. 5 each channel to be bonded by a modem bank card 500 arrives at the card over a separate modem interface 521–543 and is separately demodulated by interface circuitry 521–543. The processor 511, through the receipt of control data from the control interface 550, modem interfaces 521–543, or SAR circuitry 514 can determine channels to be bonded. For example, CPE 101 can initiate channel bonding by including a channel bonding request in each modem's transmitted data stream during connection establishment and capability negotiation by the modem. ISDN channel bonding may be performed using standard or proprietary ISDN channel bonding protocols. Similarly, POTS modem data bonding may be performed using standard or proprietary bonding protocols such as those provided by the Windows 98™ operating system. The channel bonding request data may be detected by, for example, modem interfaces 521–543 or SAR circuitry 514. After detection of a channel bonding request, the processor 511 instructs the SAR circuitry to bond the channels. Channels may be bonded by, for example, byte-interleaving data from a first channel with data from a second channel thereby forming a higher bit rate interleaved data stream. The higher bit rate interleaved data stream is then processed into ATM cells by the SAR circuitry 514. SAR circuitry 514 may include data buffers and processing logic to synchronize data streams from the data channels to be bonded. Channel bonding may be similarly applied to the ISDN bank card 800 (FIG. 8).

Figure 9:
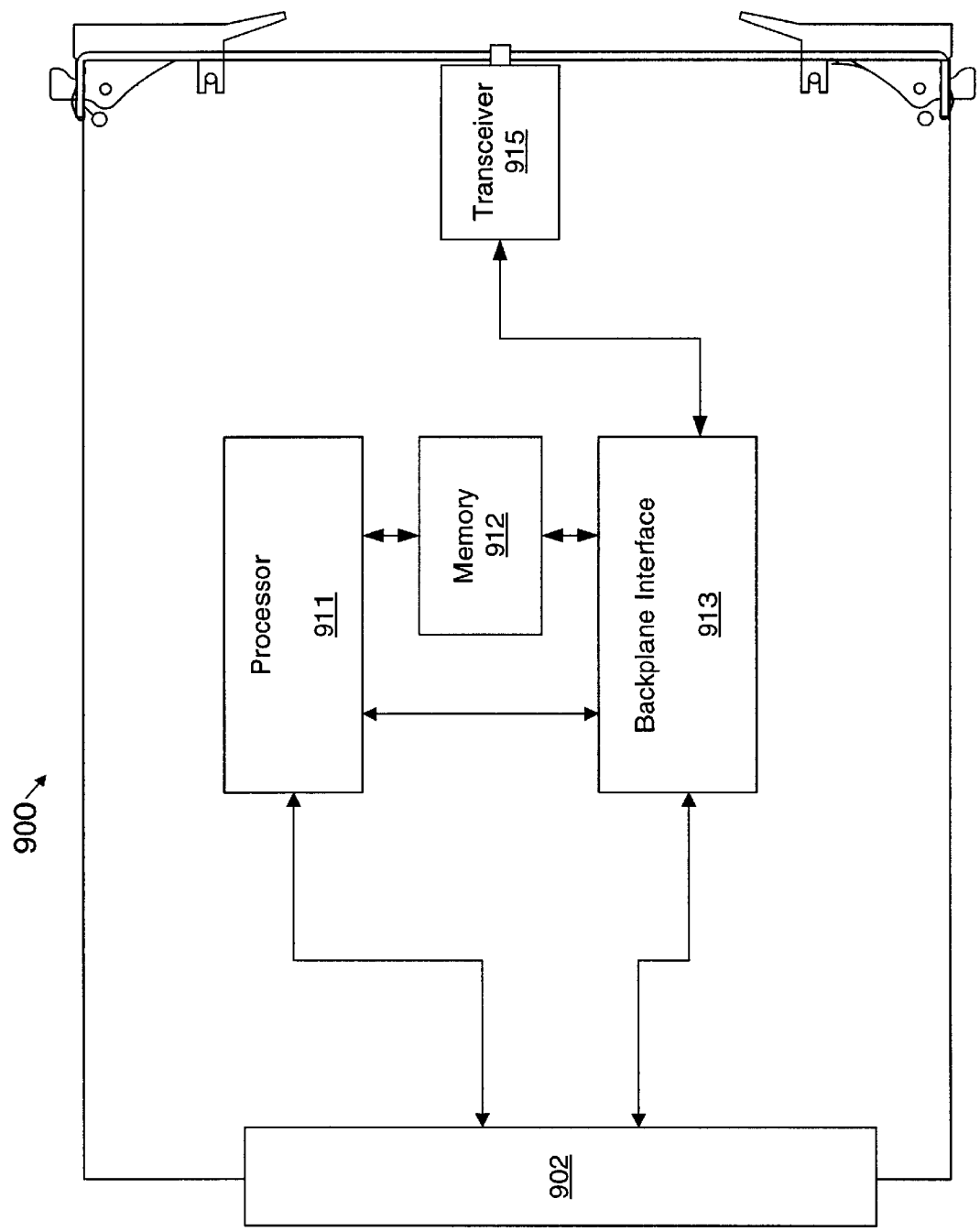
FIG. 9 is a functional diagram of an exemplary DSLAM ATM transmission card, in accordance with the invention.

Channel bonding may also be provided by a separate channel bonding card. Referring to FIGS. 6 and 7, as previously discussed, the modem bank card 600 can receive multiple POTS modem connections and provides a digitized data stream to an ATM cell conversion card 700. SAR circuitry 714 on the cell conversion card 700 may detect channel bonding request in data streams received from the modem bank card 600 and bond channels in a manner as described with respect to the card 500 (FIG. 5). The use of a separate channel bonding card, such as card 700, may be advantageous where, for example, channels to be bonded arrive at separate modem bank cards. In such a case, the modem bank card will be unable to bond the channels (unless the remaining channel data is provided to the modem bank card over, for example, the backplane interface 502 or other interface between modem bank cards). A separate card 700 can, however, receive data from separate channel bank cards and bond each channel's data into a single ATM data stream. A separate channel bonding card with ATM interfaces to multiple modem cards 500 may also be used when channels to be bonded arrive at separate modem cards 500. In such a case, each modem card 500 may produce ATM cells from the channel it receives, provide the ATM cells to a separate channel bonding card, and the separate channel bonding card can disassemble and reassemble the ATM cells from the separate modem cards into a single bonded ATM cell stream. As depicted, the channel bonding card 700 includes transceiver 715. The transceiver 715 may provide, for example, an ATM mode SONET connection to an ATM cell routing network. Thus, for example, the card 700 may be used with one or more modem bank cards 600 (FIG. 6) in a DSLAM to interconnect the modem bank cards to the ATM network. In an implementation using a separate transmission card, modem bank cards 600 and 700 as well as channel bonding card 700 may provide data to a separate ATM transmission card 900 (FIG. 9) that provides for ATM cell transmission between the DSLAM and an ATM cell routing network. The transmission card 900 (FIG. 9) includes, for example, a backplane interface 913, transceiver circuitry 915 and logic circuitry 911 and 912. In some implementations, the transmission card 900 may also include ATM segmentation and reassembly (SAR) circuitry operatively coupled to the backplane interface and to the transceiver circuitry.

Modem bank and ISDN bank cards may be constructed with a lesser or greater number of interface channel circuits than described herein. For example, a modem interface card may have a T3 interface to a POTS switch to receive six hundred and seventy-two 64 Kbps continuous bit rate channels. Modem and ISDN B-channel interfaces may each be implemented as a separate discrete device or may be part of an integrated hardware devices. For example, a very large scale integrated circuit may include twenty three modem interfaces, a D-channel interface, and an ISDN PRI multiplexer in a single "chip". Modem and ISDN interfaces may also be provided through a software-configured general purpose processor or digital signal processor. Functionality may be split across multiple boards in a DSLAM. For example, a first circuit board may include modem transceivers and may be coupled over a proprietary digital backplane interface to a second circuit board having ATM cell segmentation and assembly circuitry and ATM network interface circuitry.

In various implementations, either ITU-standard 53-byte ATM cells, non-standard ATM cells, or both ITU-standard and non-standard ATM cells may be sent from the modem bank card over the backplane interface. For example, a non-standard 54-byte cell may be formed by adding an additional parity byte to a standard 53-byte cell. This additional parity byte may provide for a parity check of the preceding 53 bytes ITU-standard ATM cell. Such a 54 byte cell may be sent, for example, between the modem bank card and other components within the DSLAM 410 with a conversion to a standardized 53 byte cell occurring at the interface to the ATM network. A modem bank card and modem bank card shelf may include additional interfaces to, for example, modem bank card shelf control components and network management systems.

If, for example, an originating central office DSLAM supporting data-to-ATM cell conversion is unavailable, POTS modem calls and/or ISDN B channels may be routed through the POTS/ISDN network to an intermediate central office having available DSLAM data-to-ATM conversion capacity. Conversion of data to ATM cells may then occur at the intermediate central office and the resulting ATM cells may be transported across the ATM network to a destination point. The use of telephone network trunk and tandem switch capacity between the intermediate central office at the destination point may thereby be avoided.

In some applications, the ATM cells may be converted back to a modulated data format by a destination DSLAM and the data from the ATM cells can be delivered to the destination as modem-modulated data.

In a facsimile implementation, modulated data between originating and destination facsimile equipment may be converted to ATM cells at an originating central office or intermediate network point and routed to a destination point as ATM cells. For example, modulated data from an originating facsimile device may be routed by the originating central office switch to a facsimile-compatible modem-to-ATM cell conversion card, the facsimile data can be placed in ATM cell payloads and routed through an ATM network to a destination endpoint. At the destination endpoint the FAX data in the ATM cells can be converted back to modulated facsimile data for delivery to destination facsimile equipment.

The particular circuit cards and circuitry components shown herein are exemplary. Implementations can include circuit cards interconnected by a backplane or can include a single circuit board or card integrating all components necessary for a modem bank to ATM cell network interconnection. Implementations are not limited to the particular circuit card arrangements shown herein. Implementations may include a different number or arrangement of circuit cards and circuit card may include the components illustrated herein or may include a different arrangement or combination of components to achieve POTS and ISDN data to ATM cell conversion.

Still other embodiments are within the scope of the following claims.

I claim as my invention:

1. A data communication apparatus for communicating data between trunk channels and a cell-based network, the apparatus comprising:

trunk interface circuitry operative to receive continuous bit rate call data over a trunk channel and comprising circuitry to receive a 23B+D integrated services digital network (ISDN) primary rate interface trunk;

the call data comprising "B" channel data from a selected one of the ISDN primary rate interface "B" channels;

the "B" channel data comprising an original data stream being sent from the originator to the recipient, data interface circuitry operatively coupled to the trunk interface circuitry, the data interface circuitry operable to receive the call data from the trunk channel and extract the original data stream;

cell segmentation circuitry operative to receive the original data stream from the data interface circuitry and to produce data cells, the cell segmentation circuitry is operatively coupled to the control circuitry to receive the header field data; and control circuitry coupled to the trunk interface circuitry to transmit and receive control data over the ISDN primary rate interface "D" channel, wherein for each data cell produced, a cell header is generated that includes dynamically allocated virtual path identifier (VPI)/virtual channel identifier (VCI) information based on signaling data received over the "D" channel, the control circuitry is operative to dynamically allocate the VPI/VCI information by receiving "D" channel signaling data associated with the selected "B" channel, associating VPI/VCI information with the selected "B" channel based on received signaling data, and providing header field data to the cell segmentation circuitry, the header field data comprising the VPI/VCI information, wherein the dynamically allocated VPI/VCI information uniquely identifies a modem associated with the cell.

2. The apparatus of claim 1 which the VPI/VCI information comprises a unique value that differs depending on whether data in the cell is outgoing or incoming.

3. A method for communicating data between trunk channels and a cell-based network, the method comprising:

receiving continuous bit rate call data over a 23B+D integrated services digital network (ISDN) primary rate interface, the call data including an original data stream being communicated from an originator to a recipient, the call data comprising "B" channels data from a selected one of the ISDN pi rate interface "B" channels, the "B" channel data comprising the original data Ream being sent from the originator to the recipient;

transmitting and receiving control data over the ISDN primary rate interface "D" channel;

extracting the original data stream;

producing data cells based on the original data stream; and for each data cell produced, generating a cell header that includes dynamically allocated virtual path identifier (VPI)/virtual channel identifier (VCI) information based on signaling data received over the "D" channel, wherein generating a cell header comprises:

receiving "D" channel signaling data associated with the selected "B" channel;

associating VPI/VCI information with the selected "B" channel based on received signaling data; and providing header field data to the cell segmentation circuitry, the header field data comprising the VPI/VCI information, wherein the dynamically allocated VPI/VCI information uniquely identifies a modem associated with the data cell.

4. The method of claim 3 in which the VPI/VCI information comprises a unique value that differs depending on whether data in the cell is outgoing or incoming.

* * * * *